United States Patent
LaBarge et al.

(10) Patent No.: US 6,752,859 B2
(45) Date of Patent: Jun. 22, 2004

(54) AIR CLEANER ASSEMBLY FOR REDUCING POLLUTANTS FROM BEING DISCHARGED INTO THE ATMOSPHERE

(75) Inventors: William J. LaBarge, Bay City, MI (US); Lee S. Wernholm, Burton, MI (US); Phillip J. Klempay, Grand Blonc, MI (US); Conrad H. Anderson, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 23 days.

(21) Appl. No.: 10/262,711

(22) Filed: Oct. 2, 2002

(65) Prior Publication Data

US 2004/0065197 A1 Apr. 8, 2004

(51) Int. Cl.[7] .......................... F02M 25/08; B01D 53/04
(52) U.S. Cl. ........................... 96/134; 55/385.3; 55/508
(58) Field of Search ............................... 55/385.3, 490, 55/495, 496, 505, 507, 508; 96/134, 147, 154; 123/198 E, 518; 502/407; 423/DIG. 22

(56) References Cited

U.S. PATENT DOCUMENTS

| | | | |
|---|---|---|---|
| 3,006,346 A | 10/1961 | Goldinig | 131/10 |
| 3,368,326 A | 2/1968 | Hervert | 55/161 |
| 3,477,210 A | 11/1969 | Hervert | 55/387 |
| 3,541,765 A | 11/1970 | Adler et al. | 55/316 |
| 3,572,013 A | 3/1971 | Hansen | 55/316 |
| 3,572,014 A | 3/1971 | Hansen | 55/316 |
| 3,681,898 A | 8/1972 | Hopkins et al. | 55/487 |
| 3,727,597 A | 4/1973 | Hensler | 123/136 |
| 3,747,303 A | 7/1973 | Jordan | 55/318 |
| 3,748,829 A | * | 7/1973 | Joyce et al. ............ 95/146 |
| 3,849,093 A | 11/1974 | Konishi et al. | 55/316 |
| 3,925,248 A | 12/1975 | Moroni et al. | 252/428 |
| 4,259,096 A | 3/1981 | Nakamura et al. | 55/316 |
| 4,261,717 A | 4/1981 | Belore et al. | 55/419 |
| 4,279,630 A | 7/1981 | Nakamura et al. | 55/316 |
| 4,381,929 A | 5/1983 | Mizuno et al. | 55/316 |
| 4,418,662 A | 12/1983 | Engler et al. | 123/198 |
| 4,684,381 A | 8/1987 | Wasylyniuk | 55/316 |
| 5,226,937 A | 7/1993 | Linnersten et al. | 55/274 |
| 5,423,903 A | 6/1995 | Schmitz et al. | 96/134 |
| 5,871,569 A | 2/1999 | Oehler et al. | 96/153 |

(List continued on next page.)

FOREIGN PATENT DOCUMENTS

| | | |
|---|---|---|
| EP | 0 955 459 A2 | 11/1999 |
| GB | 2204810 A | 11/1988 |
| GB | 2238731 A | 12/1991 |
| WO | WO 01/12973 A1 | 2/2001 |

OTHER PUBLICATIONS

Author Unknown "Bi–Directional Air Meter" Delphi Automotive Systems Energy and Management Systems; Copyright 1999.

Author Unknown "Energy and Engine Management Systems" Delphi Automotive Systems, Copyright 1998.

Chase, Victor "In goes the bar air, out comes the good", Research and Development (Barrington, Illinois) v37, n9, Aug. 1995 (abstract only).

Heck et al., "PremAir catalyst system–OBD concepts" SAE 2001 World Congress, Detroit, Michigan, USA, Publication Date: Mar. 5, 2001 (abstract only).

(List continued on next page.)

Primary Examiner—Frank M. Lawrence
(74) Attorney, Agent, or Firm—Jimmy L. Funke

(57) ABSTRACT

An air cleaner assembly includes an adsorber member disposed in a fluid passageway of the air cleaner assembly for eliminating pollutants from being discharged into the atmosphere contained within the air cleaner assembly. The adsorber member comprises a support and a silicate pollutant treating material free from zeolite disposed onto a surface of the support.

5 Claims, 2 Drawing Sheets

U.S. PATENT DOCUMENTS

| | | | |
|---|---|---|---|
| 5,878,729 | A | 3/1999 | Covert et al. |
| 5,892,146 | A | 4/1999 | Kobayashi et al. |
| 5,912,368 | A | 6/1999 | Satarino et al. |
| 6,152,996 | A | 11/2000 | Linnersten et al. ........... 96/135 |
| 6,178,939 | B1 | 1/2001 | Powell |
| 6,214,303 | B1 | 4/2001 | Hoke et al. |
| 6,279,394 | B1 | 8/2001 | Svoboda et al. |
| 6,309,451 | B1 | 10/2001 | Chen ........................... 96/134 |
| 6,383,268 | B2 | 5/2002 | Oda ............................ 96/134 |
| 6,422,191 | B1 | 7/2002 | Braun et al. |
| 6,440,200 | B1 | 8/2002 | Sakakibara et al. ........... 96/134 |
| 6,464,761 | B1 | 10/2002 | Bugli .......................... 96/135 |
| 2002/0043156 | A1 | 4/2002 | Shea ........................... 96/134 |
| 2002/0059920 | A1 | 5/2002 | Yoshioka et al. ........... 123/518 |
| 2002/0124733 | A1 | 9/2002 | Iriyama et al. ............... 96/134 |
| 2002/0129711 | A1 | 9/2002 | Oda et al. ..................... 96/134 |
| 2003/0056770 | A1 | 3/2003 | Honda et al. ............... 123/516 |
| 2003/0066427 | A1 | 4/2003 | Ishida .......................... 96/135 |

OTHER PUBLICATIONS

Petersson et al. "PremAir catalyst system–Long–term, on–road aging results" SAE International fall fuels and lubricants meeting and exposition Baltimore, MD, USA, Publication Date: Oct. 1, 2000 (abstract only).

Hoke et al. "PremAir catalyst system–A new approach to cleaning the air" SAE International fall fuels and lubricants meeting and exposition Toronto, Ontario, Canada Publication Date: Oct. 1, 1999 (abstract only).

Angsburger et al. "FTIR and Mossabauer investigation of a subnstituted palygorskite: Silicate with a channel structure" Journal of Physics and Chemistry of Solids, 59(2) 175–180 Feb. 1998 (abstract only).

Unknown "Sepiolite and Palygorskite" U.S. Geological Survey Open–Fuel Report 01–041, A Labratory Manual for X–Ray Powder Diffraction, Maintained by Eastern Publications Group.

Wang et al. "The sepiolite membrane for ultrafiltration" Journal of Membrane Science, 184 (2): 153–163 Mar. 30, 2001 (abstract only).

Zhang, Gaoke "Development of sepiolite type filter tips of cigarette" Journal Wuhun University of Technology, Materials Science Edition, v15, n2, Jun. 2000 Wuhan University of Technology, Wuhan, China, p49–52 (abstract only).

Ruiz–Hitzky "Molecular access to intracrystalline tunnels of sepiolite" Journal of Materials Chemistry, 11 (1): 86–91 2001 (abstract only).

Goktas et al. "Sintering behaviour of sepiolite" Cermaics International, v23, n 4, 1997 Elsevier Science Ltd., Oxford, England, p 305–311 (abstract only).

Balci "Thermal decomposition of sepiolite and variations in pore structure with and without acid pre–treatment" Journal of Chemical Technology and Biotechnology, v66, n1, pp. 72–78, May 1996, John Wiley and Sons, Ltd. (abstract only).

Bernal et al. "Natural zeolites and sepiolite as ammonium and ammonia adsorbent materials" Bioresource Technology: Biomass, Bioenergy, Biowastes, Conversion Technologies, Biotransformation, Production Technologies, v 43, n1, 1993, p 27–33.

Fujita et al. "Formation of 'Na–sepiolite' fibers by hydrothermat treatment of Na–fluor–taeniolite and Na–fluor–tetra–slicic mica" Journal of Ceramic Society of Japan, International Edition,v 101, n 5, May 1993, p 587–590 (abstract only).

Balci "*Effect of heating and acid pre–treatment on pore size distribution of sepiolite*" *Clay Minerals*, v34, n4, 1999 Mieralogical Soc of Great Britain, London, England p 647–655 (abstract only).

Watanabe et al. "Calcined sepiolite–supported Pt/Fe catalyst" Applied Clay Science, v16, n1–2, Jan. 2000, Elsevier Science, Publishers B.V., Amsterdam, Netherlands, p 59–71 (abstract only).

Anderson et al. "Precursor–support interactions in the preparation of sepiolite–supported Ni anmd Pd catalysts" Clay Minerals, v 34, n1, 1999 Mineralogical Soc of Great Britain, London, England p 57–66 (abstract only).

Anderson et al. "Ni/sepiolite hydrogenation catalysts Part 1: Precursor–support interaction and nature of exposed metal surfaces"Spectrochimica Acta Part A–Molecular and Biomolecular Spectroscopy, 53 (14): 2627–2639 Dec. 1997.

Aramendia et al. "Characterization of the structure and catalytic activity of Pt/sepiolite catalysts" Journal of Colloid and *Interface Science*, 227 (2): 469–475 Jul. 15, 2000 (abstract only).

Aramendia et al. "Transformation of cyclohexene on palladium catalysts: activity and deactivation" Journal of Molecular Catalysis A–Chemical, 151 (1–2): 261–269 Feb. 15, 2000 (abstract only).

de la Fuente et al. "Isomerization of lactose catalyzed by alkaline–substituted sepiolites" Food Chemistry, 66 (3); 301–306 Aug. 1999 (abstract only).

Brigatti et al., "Behaviour of sepiolite in Co2+Cu2+ and Cd2+ removal from a simulated pollutant solution" Annali Di Chimica, 88 (7–8):461–470 Jul.–Aug. 1998 (abstract only).

d'Espinose et al. "Aluminum modified sepiolite as catalyst or catalyst support" Preprints–Division of Petroleum Chemistry, American Chemical Society, Symposium on Catalyst Support; Chemistry, Forming and Characterization, Aug. 25–30, 1991, New York, NY, USA (abstract only).

Suyama et al. "Synthesis and properties of FA–zeolite–sepiolite composite adsorbent" Journal of the Ceramic Society of Japan, 109 (2): 155–161 Feb. 2001 (abstract only).

Song–jun et al. "Modification of sepiolite and its application in catalysis" Institute of Applied Chemistry of Nanchang, University, Nanchang 330047, Jiangxi, China (abstract only).

Author Unknown—"Sepiolite 30801" Material Data Sheet Nov. 10, 1999 ITC, Inc. Hunt Valley, Maryland 21030.

Author Unknown—NSX 1991–1992 Acura Parts Catalog Second Edition 1992 "*Air Cleaner*" www.nsxsc.com/nsx-parts.

ACDelco Know Your Vehicle—"The Engine an ACDelco Vehicle Operations and Maintainance" www.weekendmechanisclub.com/ACDelco/vobeng1.htm.

Author Unknown "The Phyllosilicate Subclass (The Sheet Structures) A subclass of the Silicates" Copyright 1998 Amethyst Galleries www.mineral.gallaries.com.

Author Unknown "For Good Measure: Delphi's New Air Meters" www.delphiauto.com/news/solutions/monthy/ms6068–11012001.

Mark H. Svoboda "Comparison of Air Meter Interface Strategies for Engine Management Systems" SAE Technical Papers, SAE 2000 World Congress, Detroit, Michigan, Mar. 6–9, 2000.

Author Unknown "Modular Air Meters" Delphi Automotive.

Author Unknown "Integrated Air/Fuel Modules—Metal Manifold" Delphi Automotive.

Author Unknown—Filter Description Page—"Dust Trap/ Activated Carbon Filters" www.afinc.com/descr.htm.

Author Unknown—Dust Trap Page—"More Than a Filter— The original Dust Trap, activa ted carbon absorber for furnaces and central air conditioners." www.afinc.com/dustrap.html.

K.D. Henning and S. Schafer "Impregnated Activated Carbon for Environmental Protection" www.activated–carbon.com/enviro.html.

* cited by examiner

AIR CLEANER ASSEMBLY FOR REDUCING POLLUTANTS FROM BEING DISCHARGED INTO THE ATMOSPHERE

BACKGROUND

As internal combustion engines wear, the annular spaces between the pistons and the cylinder tend to increase. In the combustion chamber of each cylinder, an air-fuel mixture is ignited. The expanding gas mixture forces the piston upwards generating power from the engine. In the expansion process, part of the gas mixture is forced between the annular spaces between the piston and the cylinder into the crankcase. These "blow-by" gases, which also include oil mist and unburned fuel, accumulate in the crankcase and must be vented from the crankcase to the atmosphere to prevent a potentially dangerous pressure build-up in the crankcase. In addition, unburned fuel can be present in the combustion chambers after the internal combustion engine is shut down. These hydrocarbons cannot get to the crankcase without the pistons moving, but they may escape through open valves and migrate back through the air intake system. In addition, the activated carbon canister may release significant amounts of stored hydrocarbons when a vehicle has not run for a number of days.

Pollution control laws and regulations restrict the emissions from internal combustion engines. As exhaust gases from internal combustion engines have become cleaner, the blow-by gases and evaporative emissions have become a more significant fraction of the total pollution generated from internal combustion engines. In many localities, the pollution control laws and regulations are such that vapors from the internal combustion engines must be cleaned prior to discharge into the atmosphere. The current evaporative emissions requirements require emissions of less than 2.0 grams of fuel vapor over a one-hour test period. It is expected that these requirements will change in the year 2004 to requiring emissions of less than 2.0 grams fuel vapor over a three day test period.

SUMMARY

Disclosed herein is an air cleaner assembly, an adsorber member, and a process for reducing pollutants from being discharged into the atmosphere.

The air cleaner assembly comprises a housing comprising a filter element situated therein, an outlet for allowing filtered air to flow to the engine, and an inlet conduit extending from the housing for permitting the entry of air into the housing; a retainer coupled to the inlet conduit, the retainer comprising a wall defining a first open end and a second open end, wherein the wall forms a cuffed portion about the second open end and has an annular recess facing the first open end, wherein a portion of an annular wall of the inlet conduit is seated in the recess; a clamping device disposed about the second open end and the portion of the annular wall to provide an air tight seal between the retainer and housing coupling; and an adsorber member sealingly disposed within the first open end, wherein the adsorber member comprises a silicate adsorbing material free from a zeolite material.

The adsorber member comprises a support comprising a plurality of fluid passageways; and a silicate pollutant treating material free from zeolite disposed onto a surface of the support. In one embodiment, the silicate pollutant treating material comprises sepiolite.

The process for reducing pollutants from being discharged into the atmosphere comprises disposing an adsorber member in a fluid passageway of the air cleaner assembly, wherein the adsorber member comprises a support comprising a plurality of fluid passageways and a silicate pollutant treating material free from zeolite disposed onto a surface of the support; and contacting a fluid flowing through the fluid passageway with the adsorber member.

The above-described and other features will be appreciated and understood by those skilled in the art from the following detailed description, drawings, and appended claims.

BRIEF DESCRIPTION OF THE DRAWINGS

Referring now to the figures wherein the like elements are numbered alike.

DESCRIPTION OF THE PREFERRED EMBODIMENT

The present disclosure relates to an air induction system and process for reducing fuel emissions. More particularly, the present disclosure relates to an air induction system and process for eliminating fuel emissions from an air cleaner assembly, for example, eliminating fuel emissions that accumulate in the air cleaner assembly after shutdown of an internal combustion engine.

Figure 1:
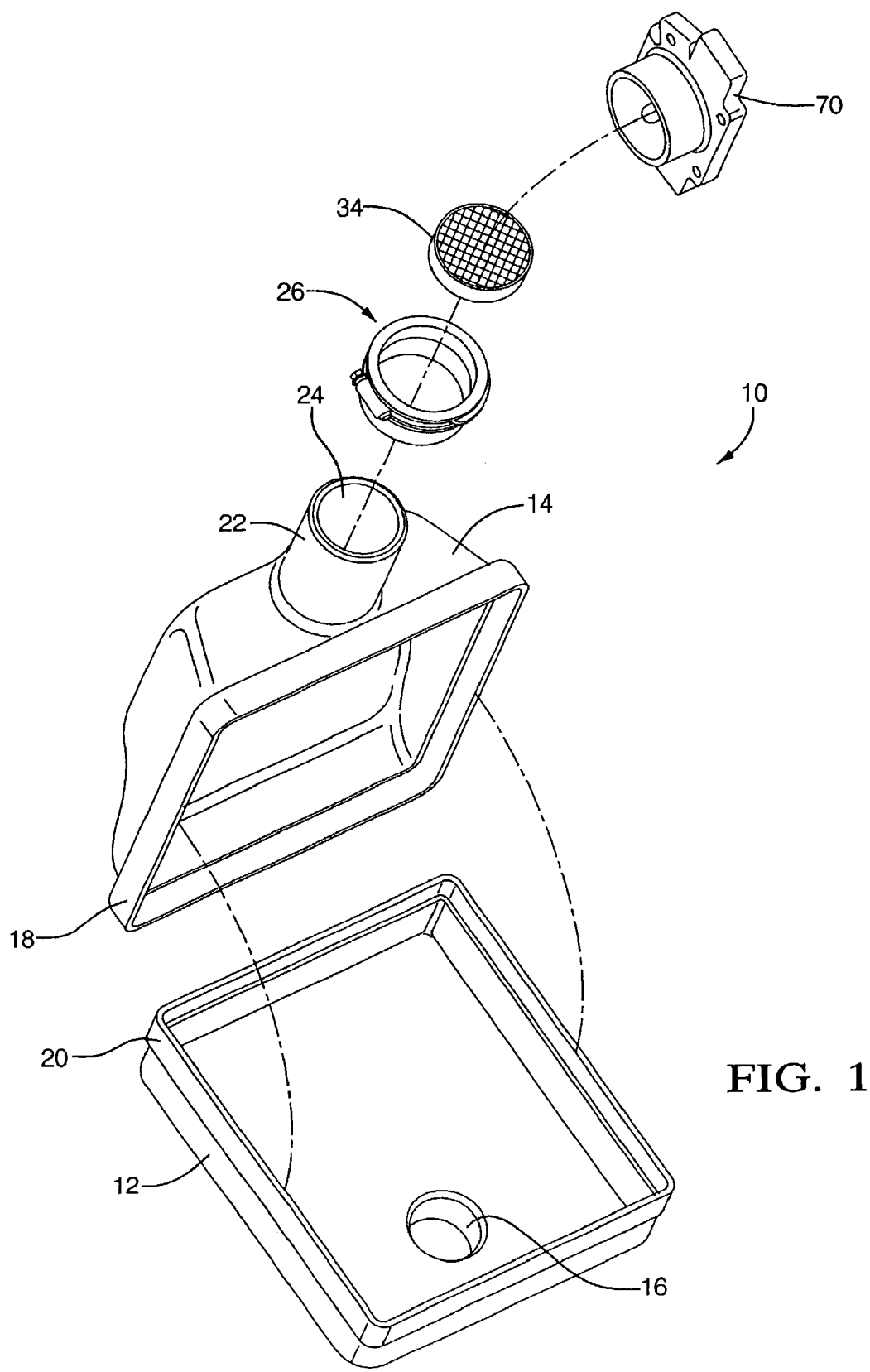
FIG. 1 is an exploded perspective view of an air cleaner assembly.

Referring now to FIG. 1, there is shown an exploded perspective view of an air cleaner assembly 10. The illustrated shapes of the various components that form the air cleaner assembly 10 are exemplary only and can be any general shape desired. The air cleaner assembly 10 generally comprises a lower case 12 and an upper case 14 that houses one or more filter elements (not shown) for removing particulate matter from an air stream during operation of the internal combustion engine. The lower and upper cases, 12 and 14 respectively, are preferably injection molded from a synthetic resin (e.g., polyolefins such as polyethylene and polypropylene, polystyrene and other styrenes such as styrene-acrylonitrile copolymer and ABS resins, polyamides such as nylon 6 and nylon 6,6, polyacetal, polyesters, polyphenylene ether, and polyvinyl chloride). The lower case 12 is shown with a cup-like shape and includes an outlet opening 16 in fluid communication with an internal engine combustion chamber or chambers through a carburetor or intake manifold. The upper case 14 of the air cleaner assembly 10 has an inverted cup-like shape that includes an outer peripheral rim 18. As previously discussed, the upper and lower case can be a shape other than that shown, e.g., circular, rectangular, oblong, crescent, and the like. The rim 18 is adapted to be clamped or otherwise secured to a complementary rim structure 20 in the lower case 14. Alternatively, the upper case 14 may be secured to the lower case 12 by hinges, bolts, or other means for matingly securing the upper case 14 to the lower case 12. Preferably, the lower 12 and upper 14 cases, when secured, form a tight seal that effectively prevents entry or discharge of gases through the seal. A conduit 22 extends from the upper case 14 to provide inlet opening 24. Preferably, the conduit 22 is cylindrically shaped having an annular wall structure. The conduit 22 is preferably integrally molded with the upper case 14 during fabrication of the upper case (e.g., injection molded). During operation, the inlet opening 24 permits the entry of air into the air cleaner assembly 10 to the engine combustion chamber or chambers.

The one or more filter elements for removing particulate matter from an air stream during operation of the internal combustion engine can have an insert or spacer construction that generally includes an outer liner and an inner liner. A media construction can be positioned between the outer liner and inner liner. A variety of materials can be utilized for the outer and inner liners including expanded metal, perforated metal and plastic liners, as examples. In general, the outer and inner liners should preferably: (a) be selected of materials appropriately perforated or otherwise made porous so as not to substantially interfere with airflow through the arrangement; and (b) be of appropriate structural rigidity and strength to contain the media construction and provide the arrangement with sufficient axial strength for the use intended and to protect the media construction from damage. Typical liners have an open area of at least 50%, often 60% or more. Galvanized metal or plastic arrangements are typically preferred. Herein the combination of the outer liner, inner liner and media construction will sometimes be referred to as the media pack. The media construction may comprise a pleated media, or alternatively, a depth media. If pleated media is used, in general, paper or cellulose fiber media or media comprising cellulose fibers and synthetic fibers can be used.

The filter element may also include first and second opposite end caps. The end caps may comprise a soft, compressible elastomer, such as foamed polyurethane; however, a harder material can be used as one or more of the end caps, with the media and liners secured to the end caps by potting material such as an adhesive, for example, a plastisol adhesive.

A retainer 26, preferably made from a resilient material, is disposed onto the cylindrically shaped conduit 22 of the upper case 14. Suitable resilient materials include rubber, polybutadiene rubber, polyisoprene rubber, styrene rubber, styrene-butadiene rubber, acetonitrile-butadiene rubber, polychloroprene rubber, caoutchouc rubber, ethylene propylene diene monomer (EDPM) rubber and vulcanized versions of the aboye-mentioned rubbers such as vulcanized ethylene propylene diene monomer rubber. Hydrogenated nitrile rubber, vinyl methyl silicone elastomer (VQR silicone). Preferred is a fluoroelastomer such as Dupont Dow Elastomers FKM-AL a fluorine terpolymer, FKM-F a fluorine terpolymer, FKM-GFLT a perfluoromethylvinyl ether monomer. Particularly preferred is Dupont Dow Elastomer FKM-AL. In a preferred embodiment, the retainer 26 is a single walled integral structure fabricated or molded from the resilient material.

Figure 2:
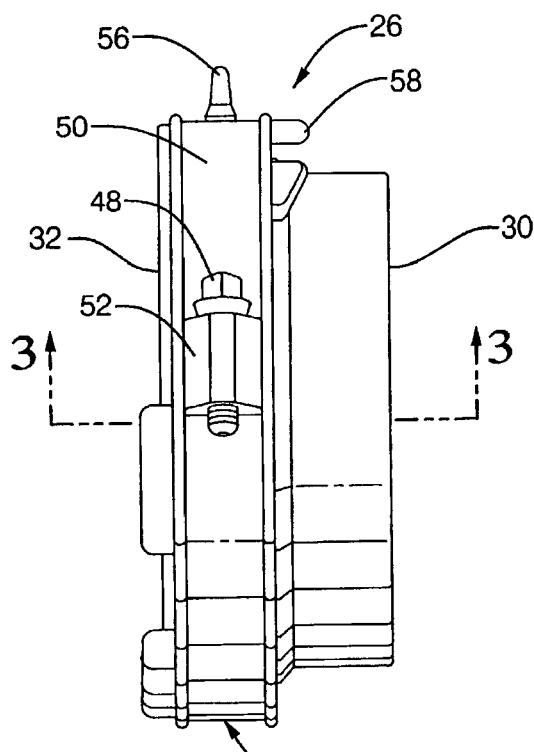
FIG. 2 is a perspective view of a retainer for use in the air cleaner assembly.
Figure 3:
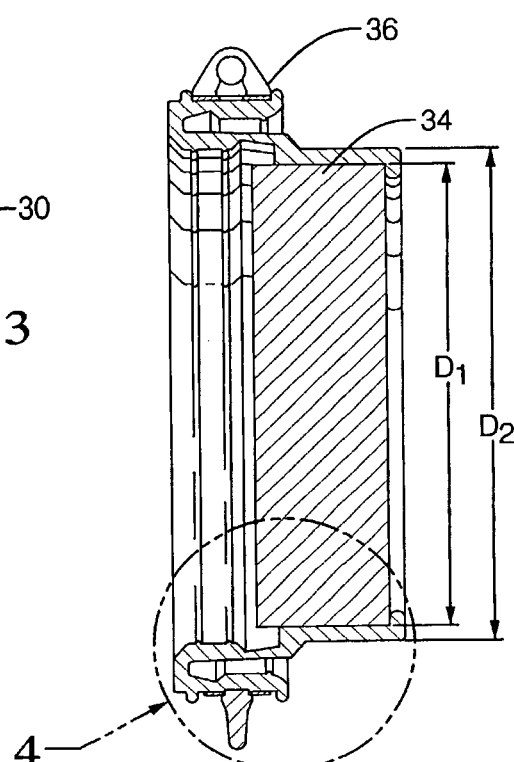
FIG. 3 is a cross-sectional view of the retainer of FIG. 2 taken along lines 3—3.
Figure 4:
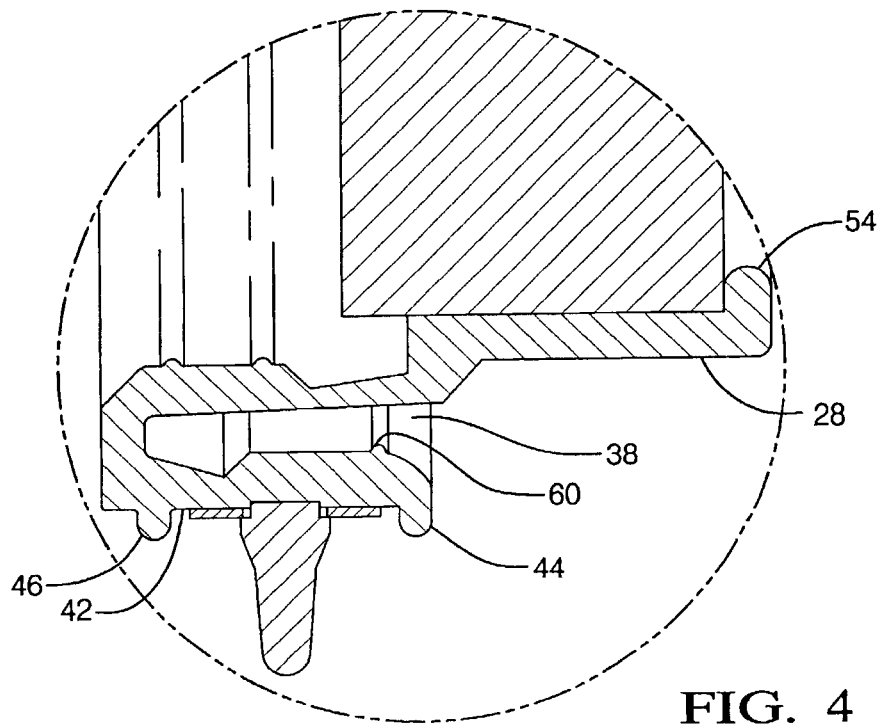
FIG. 4 is a magnified view of section "4" of the retainer shown in FIG. 3.

As shown more clearly in FIGS. 2, 3, and 4, the retainer 26 generally comprises an annular wall 28 defining a first open end 30 and a second open end 32. The first open end 30 preferably has an inner diameter D1 about equal to an outer diameter of an adsorber member 34 and an outer diameter D2 about equal to or less than an inner diameter of the cylindrically shaped conduit 22.

The second open end 32 comprises a cuffed portion 36 formed by annular wall 28. The cuffed portion 26 includes an annular recess 38 that is adapted to receive and accommodate a width of the annular wall defining the cylindrically shaped conduit 22. In this manner, the retainer 26 can be press fit onto the inlet conduit 22 by aligning the recess 36 of the retainer 26 with the wall defining the conduit 22, i.e., a portion of an annular wall of the inlet conduit 22 is seated in the annular recess 38. A clamping device 40, preferably a screw and threaded band type hose clamp (type F), circumscribes the outermost peripheral surface 42 of a portion of retainer wall 28 disposed about the second open end 32. Other suitable clamping devices include those hose clamps designated as A, B, C, D, and E as defined by the Society of Automotive Engineers Standard J536b. Preferably, the outermost peripheral surface 42 of wall 28 disposed about the second open end 32 includes two spaced apart protrusions 44, 46 for accommodating and seating the band (or wire) of the clamping device 40.

As previously disclosed, the clamping device 40 preferably includes a threaded screw 48 and complementary threaded band 50 and holder 52 for adjusting the diameter of the band 50. In this manner, rotation of the screw 48 can be used to sealingly compress wall 28 against the wall defining the cylindrically shaped conduit 22. The interior surface of the wall 28 defining the recess 38 may further include one or more protrusions 52. In this case, the cylindrically shaped conduit 22 may have a ribbed exterior wall surface.

The retainer 26 may further include additional elements, such as a cuff attachment element, a guide element, a support element, and combinations comprising at least one of the foregoing. The additional elements may be disposed wholly or partially on the exterior and/or interior surfaces of wall 28 of the retainer 26. For example, as shown in FIG. 2, cuff attachment element 56 may be disposed on the outermost peripheral surface 42 of the cuff portion 36. A guide element 58 may also be formed in wall 31 and laterally disposed on the cuff portion 20. Additionally, although the components of the clamping device 40 may be made out of different materials, preferably retainer 26 is made of materials that can withstand the temperature and chemical conditions that occur during manufacture and operation.

The adsorber member 34, also referred to as a flow regulator, is preferably press fit into the opening defined by the first open end 30 and is preferably seated against interior surfaces provided by annular wall 28 and an annular protrusion 54 that extends about an inner peripheral end of the first open end 30. The conformity of shape of the first open end 30 is preferably such as to produce an airtight seal between the adsorber member 34 and the wall 28 defining the first open end 30. In this manner, all gases flowing into the air cleaner assembly 10 will flow through the adsorber member 34. Likewise, any gases contained within the air cleaner assembly 10 such as, for example, those unburned fuel gases that may accumulate in the air cleaner assembly 10 after engine shutoff, will pass through the adsorber member 34 in order to enter the atmosphere.

The adsorber member 34 may comprise a substrate coated with materials including, but not limited to, pollutant treating materials, modifying agents, binders, and the like, and combinations comprising at least one of the foregoing. The substrate can include any material designed for use in a spark ignition or diesel engine environment and which has the following characteristics: (1) capable of operating at elevated temperatures dependent upon the device's location and the type of system (e.g., gasoline or diesel); (2) capable of withstanding exposure to saturated and unsaturated hydrocarbons, nitrogen oxides, carbon monoxide, particulate matter (e.g., soot and the like), carbon dioxide, ozone, and/or sulfur oxides; and (3) have sufficient surface area and structural integrity to support a pollutant treating material, and, where desired, a catalyst. Some possible materials include polymers, paper, fiber, cardboard, aluminum, cordierite, ceramics, silicon carbide, metal, metal oxides (e.g., aluminum oxide, and the like), glasses, and the like, and combinations comprising at least one of the foregoing materials. In a preferred embodiment, the support comprises an aluminum metal support with oxidized aluminum at the support surface. Suitable materials include those commercially available under the trade name Aluminum Flex-Core from the Hexcel Corporation, Pleasanton, Calif. in the form of monoliths and preferably have a honeycomb-like structure. Preferred monolith supports are carriers of the type having a plurality of fine, parallel gas flow passages extending therethrough from an inlet face to an outlet face of the carrier so that the passages are open to air flow entering and passing through the monolith.

Although the substrate can have any size or geometry, the size and geometry are preferably chosen to optimize surface area in the given design parameters. Preferably, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area. Also, although each comb forming the honeycomb may be of a different size, the substrate preferably comprises a honeycomb structure wherein all combs are of about equal size. The substrate may comprise about 60 to about 600 or more fluid passageways (cells) per square inch of cross section. The thickness of the substrate may be about 0.06 inch to about 12 inches with about 0.12 to about 1.0 inches preferred. Preferably the passages are essentially straight from their inlet to their outlet and are defined by walls in which the pollutant treating material may be coated as a washcoat so that the gases flowing through the passages contact the pollutant treating material.

The pollutant treating material can be capable of adsorbing pollutants contained in the air surrounding the substrate. Although the types of pollutants may vary widely depending on the environmental conditions to which the adsorber member 34 is exposed, contemplated pollutants include, but are not limited to, saturated and unsaturated hydrocarbons, certain carbon oxides (e.g., carbon monoxide), nitrates, sulfides, ozone, and the like, and combinations comprising at least one of the foregoing. Such pollutants may typically comprise 0 to 400 parts per billion (ppb) ozone, 1 to 20 parts per million carbon monoxide, 2 to 3000 ppb unsaturated hydrocarbons such as $C_2$ to $C_{20}$ olefins and partially oxygenated hydrocarbons such as alcohols, aldehydes, esters, ketones, and the like. In a preferred embodiment, the pollutant treating material selectively adsorbs hydrocarbons primarily responsible for causing smog, unsaturated hydrocarbons containing at least one double bond such as those unsaturated hydrocarbons utilized in fuels and byproducts caused by combustion.

In a preferred embodiment, the pollutant treating material comprises silicate materials. The preferred silicate materials are free from zeolites. Suitable silicate materials include, but are not limited to, silicates belonging to the phyllosilicate class of silicates. Phyllosilicates include, but are not limited to, smectites, palygorskites, sepiolites, tuperssuatsiaite, yofortierite, kalifersite, falcondoite, loughlinite, and combinations comprising at least one of the foregoing phyllosilicates, wherein smectites, palygorskites, sepiolites, and combinations comprising at least one of the foregoing phyllosilicates are preferred. In a preferred embodiment, the silicate pollutant treating composition is sepiolite or a composition including sepiolite.

When loaded onto the support, the silicate loading is preferably about 0.10 g/in³grams per cubic inch (g/in³) to about 4.0 g/in³, based on the volume of the support. More preferably, the silicate loading is about 0.25 g/in³ to about 1.00 g/in³, based on the volume of the support.

The silicate material may be either pure, i.e., 100% silicon oxides, or it may comprise other materials, such as, but not limited to, alkaline ions including lithium, sodium, potassium, cesium, magnesium, calcium, strontium, barium and combinations comprising at least one of the foregoing. These alkaline ion silicate materials are preferably prepared by substituting $Mg^{+2}$ ions of the silicate materials with the alkaline ions. The preferred silicate material contains elements for improved storing of hydrocarbons for longer periods of time and at higher temperatures.

The silicate pollutant treating composition may also comprise additional materials. Generally, the additional materials may comprise about 0.01 to about 50 weight percent based on the weight of the total pollutant treating composition. For example, the silicate pollutant treating materials may include catalytic materials of about 0.01 to about 20 weight percent of the silicate pollutant treating composition. Suitable catalysts include active metals such as platinum, palladium, rhodium, iridium, ruthenium, gold and silver, wherein platinum and palladium, and combinations comprising at least one of the foregoing catalysts are preferred. A silver doped magnesium silicate e.g. silver sepiolite is particularly preferred. The silicates may further contain stabilizing metals such as scandium, yttrium, lanthanum, titanium, zirconium, and cerium, wherein zirconium and titanium and combinations comprising at least one of the foregoing are preferred. The silicates may contain metals active for hydrocarbon double bonds such as nickel, copper, and manganese and the like, as well as oxides, alloys, and combinations comprising at least one of the foregoing catalytic materials, wherein nickel and combinations comprising at least one of the foregoing are preferred The additional materials, which may form part of the coating, may also include oxides (e.g., alumina, zirconia, titania, and the like), activated carbon, aluminides, and the like, and combinations comprising at least one of the foregoing. Where an aluminide is used, preferably the aluminide comprises an aluminum in combination with at least one additional metal, such as, nickel, iron, titanium, platinum and palladium, and a material to improve oxidation resistance such as barium, strontium, calcium, and magnesium, and oxides, alloys, and combinations comprising at least one of the foregoing, with, titanium, and oxides, alloys, and combinations comprising at least one of the foregoing particularly preferred.

The pollutant treating materials may also further comprise a binder. A preferred binder is a polymeric binder that can be a thermosetting or thermoplastic polymeric binder. The polymeric binder can have suitable stabilizers and age resistors typical in the polymeric art. The polymer can be a plastic or elastomeric polymer. Most preferred are thermosetting, elastomeric polymers.

Useful polymeric compositions include polyethylene, polypropylene, polyolefin copolymers, polyisoprene, polybutadiene, polybutadiene copolymers, chlorinated rubber, nitrile rubber, polychloroprene, ethylene- propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex.

An alternate and useful binding material is the use of a zirconium compound. Zirconyl acetate is preferred zirconium compound used. It is believed that zirconia acts as a stabilizer, promotes adsorbtion, promotes hydrocarbon retention, and improves adhesion. Upon calcination, zirconium compounds such as zirconyl acetate are converted to well dispersed nanoparticle of zirconium oxide, which is believed to be the binding material. Various useful zirconium compounds include zirconium acetates, zirconium citrates, zirconium formates, zirconium ethoxides, zirconium methoxides, zirconium propoxides, zirconium hydroxides, and the like. for generating discrete dispersions of zirconium oxide.

A suitable application of the retainer 26 described herein is for use as an air cleaner/air meter connector ("connector"). The air meter 70 may comprise any one of numerous air meter designs and is preferably capable of measuring air mass directly before the air enters the engine, converting the measurement to a signal, and communicating the air rate information to the engine management system (EMS); such information assists a fuel-control system in calculating the amount of fuel needed for optimal combustion. The air meter 70 may be inserted into the second open end 32 and further secured by adjustment of the clamping device 40. In general, the air meter 70 has a body comprising monocrystalline silicon upon which a membrane may be fixed. Although the air meter 70 can be advantageously manufactured of silicon, it is not necessary to do so. A hot film anemometer circuit for airflow measure can also be implemented on the membrane. The circuit may comprise at least two heating elements, which may be in an electrical series, and arranged parallel, and proximate to each other such that at least one heating element is upstream of at least one other heating element relative to the direction of airflow across the air meter. A sensing element can also be arranged on the membrane and represents the voltage at the center tap between the heating elements. The heating elements and sensing element are preferably contacted by interconnect traces and are able to be connected through bonding pads to external operating and evaluation circuitry.

Although the heating elements, sensing elements, interconnect traces, and bonding pads are preferably formed out of a single metal layer such as platinum, it is not necessary that they all be the same material. However, the heating elements are preferably made of a material with a high temperature coefficient of resistance, such as platinum, gold, silver, or combinations comprising at least one of the foregoing to allow a temperature difference to result in a resistance differential between the two heating elements in the presence of airflow.

A passivation layer may also be deposited on the topside of the air meter. Such a passivation layer helps to prevent contaminants from interfering with the functioning of the heating elements and sensing element.

During engine operation, the air cleaner assembly 10 will draw air from the external environment through the inlet opening 24 of conduit 22 and into the housing defined by the lower and upper cases 12, 14, respectively. The air will flow through the filter elements contained within the air cleaner assembly 10 and exit the outlet opening 16 of the air cleaner assembly 10. In this manner, the air will be filtered prior to being introduced to the combustion chamber. After the engine is shutdown, fluid from the combustion chamber, e.g., air, pollutants, and the like, may backflow or diffuse into the air cleaner assembly housing 10. In order to be discharged into the atmosphere, the fluid must pass through the adsorber member 34 sealingly disposed about its outer perimeter within the retainer 24. The adsorber member 34 will selectively and advantageously adsorb the pollutants contained within the fluid, such that pollutants will not be discharged into the atmosphere. During operation of the engine, the flow of air from the external environment will help to desorb some of the previously adsorbed fluid and carry this fluid to the combustion chamber, wherein the fluid will be combusted along with the fuel.

Advantageously, the air cleaner assembly 10 eliminates unburned fuel gases from being discharged into the atmosphere, e.g., unburned fuel gases that may accumulate in the air cleaner casing after engine shutdown. The adsorber member is disposed in the retainer on the inlet conduit of the air cleaner assembly, thereby treating the flow of gases passing through the member. Hydrocarbons and other pollutants are selectively adsorbed by the adsorber member 34, thereby effectively eliminating unburned fuel emissions from the air induction system such as may accumulate when the internal combustion engine is shut down.

The disclosure is further illustrated by the following non-limiting examples.

EXAMPLE 1

In this example, sepiolite obtained from IMV Nevada, Amardosa Valley, Nev., was calcined at 500° C. for about 4 hours. The calcined sepiolite was milled and screened through 325 mesh screen. A slurry in acetone was made consisting of 81 wt % sepiolite, 9 wt % polyacrylonitrile, and 10 wt % N-methylpyrolidinone. The slurry was made about 60 weight percent solids. The slurry was ball milled for about 2 hours. The milled slurry was then passed over an expanded aluminum honeycomb substrate with hexagonal cells about 0.0625 inches in diameter, 256 cells per cubic inch. The coated honeycomb substrate was then heated to about 150° C. to evaporate the N-methylpyrolidinone and acetone. The heating exposed the porosity of the coating. The coating had a thickness of about 20 to about 40 microns.

EXAMPLE 2

In this example, an expanded aluminum honeycomb substrate was coated with sepiolite as in Example 1. The coated honeycomb substrate was heated to about 350° C. to decompose the zirconium citrate. The coating had a thickness of about 40 to about 60 microns.

EXAMPLE 3

In this example, about 740.1 grams silica was mixed with 69.1 grams magnesium acetate from Aldrich. The mixture was calcined to 738° C. for about 9 hours. The calcined mixture was ball milled for about 4 hours then screened through 325 mesh screen. The resulting mixture is a synthetic sepiolite. A slurry was made consisting of 89 wt % synthetic sepiolite and 11 wt % zirconium citrate. Water was added to make a slurry of about 46 weight percent solids. The slurry was ball milled for about 2 hours. The milled slurry was passed over expanded aluminum honeycomb substrate with hexagonal cells about 0.125 inches in diameter, 64 cells per cubic inch. The coated honeycomb substrate was heated to about 350° C. to decompose the zirconium citrate. The substrate was post impregnated with a silver acetate solution. The resulting adsorption material layer disposed upon the catalyst washcoat layer comprised about 1.0 wt % silver oxide by weight of the adsorption material layer. The silver sepiolite coating had a thickness of about 40 to about 60 microns.

EXAMPLE 4

In this example, a slurry was made consisting of 500 grams synthetic sepiolite prepared as in Example 3, 50 grams dibutyl phthalate and 50 grams poly (vinylidenedifluoride) powder. Acetone was added to make the slurry about 46 weight percent solids. The slurry was ball milled for 2 hours. The milled slurry was passed over expanded aluminum honeycomb substrate with hexagonal cells about 0.125 inches in diameter, 64 cells per cubic inch. The coated honeycomb substrate was heated to about 280° C. The sepiolite coating had a thickness of about 40 to about 60 microns.

EXAMPLE 5

In this example, the synthetic sepiolite prepared as in Example 3 was ion exchanged with a silver trifluoroacetate solution. The silver trifluoroacetate-sepiolite was then calcined at 400° C. A 1.0 wt % silver doped sepiolite was recovered. A slurry was made consisting of 500 grams silver doped synthetic sepiolite, 50 grams dibutyl phthalate, 50 grams poly(vinylidenedifluoride) powder as binder. Acetone was added to make the slurry about 46 weight percent solids. The slurry was ball milled for 2 hours. The milled slurry was passed over expanded aluminum honeycomb substrate with hexagonal cells about 0.125 inches in diameter, 64 cells per cubic inch. The coated honeycomb substrate was heated to about 280° C. The silver sepiolite coating had a thickness of about 40 to about 60 microns.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An air cleaner assembly for an internal combustion engine, the air cleaner assembly comprising:
    a housing comprising a filter element situated therein, an outlet for allowing filtered air to flow to the engine, and an inlet conduit extending from the housing for permitting the entry of air into the housing;
    a retainer coupled to the inlet conduit, the retainer comprising a wall defining a first open end and a second open end, wherein the wall forms a cuffed portion about the second open end and has an annular recess facing the first open end, wherein a portion of an annular wall of the inlet conduit is seated in the recess;
    a clamping device disposed about the second open end and the portion of the annular wall to provide an air tight seal between the retainer and housing coupling; and
    an adsorber member sealingly disposed within the first open end, wherein the adsorber member comprises a silicate adsorbing material free from a zeolite material.

2. The air cleaner assembly according to claim 1, wherein the adsorber member comprises a phyllosilicate material.

3. The air cleaner assembly according to claim 1, wherein wherein the adsorber member comprises a sepiolite.

4. The air cleaner assembly according to claim 2, wherein the phyllosilicate material is selected from the group consisting of smectites, palygorskites, sepiolites, tuperssuatsiaite, yofortierite, kalifersite, falcondoite, loughlinite, and combinations comprising at least one of the foregoing phyllosilicates.

5. The air cleaner assembly according to claim 1, wherein the adsorber member comprises a monolithic structure free of a zeolite comprising a support and a silicate pollutant treating material.

* * * * *